United States Patent
Stadelmayer et al.

(10) Patent No.: US 12,504,526 B2
(45) Date of Patent: Dec. 23, 2025

(54) RADAR-BASED SEGMENTED PRESENCE DETECTION

(71) Applicant: Infineon Technologies AG, Neubiberg (DE)

(72) Inventors: Thomas Reinhold Stadelmayer, Wenzenbach (DE); Kevin Kaiser, Munich (DE); Souvik Hazra, Munich (DE); Avik Santra, Munich (DE)

(73) Assignee: Infineon Technologies AG, Neubiberg (DE)

( * ) Notice: Subject to any disclaimer, the term of this patent is extended or adjusted under 35 U.S.C. 154(b) by 391 days.

(21) Appl. No.: 17/949,608

(22) Filed: Sep. 21, 2022

(65) Prior Publication Data
US 2024/0111040 A1 Apr. 4, 2024

(51) Int. Cl.
*G01S 13/04* (2006.01)
*G01S 13/89* (2006.01)

(52) U.S. Cl.
CPC .............. *G01S 13/04* (2013.01); *G01S 13/89* (2013.01)

(58) Field of Classification Search
CPC .... G01S 13/931; G01S 13/584; G01S 13/343; G01S 13/42; G01S 13/356; G01S 13/726; G01S 13/354; G01S 13/56; G01S 13/89; G01S 13/04; G01S 7/2883
USPC .................................................. 342/109, 191
See application file for complete search history.

(56) References Cited

U.S. PATENT DOCUMENTS

| | | | |
|---|---|---|---|
| 4,241,347 A | 12/1980 | Albanese et al. | |
| 6,147,572 A | 11/2000 | Kaminski et al. | |
| 6,232,922 B1 * | 5/2001 | McIntosh | G01S 19/14 342/453 |
| 6,414,631 B1 | 7/2002 | Fujimoto | |

(Continued)

FOREIGN PATENT DOCUMENTS

| CN | 1463161 A | 12/2003 |
|---|---|---|
| CN | 1716695 A | 1/2006 |

(Continued)

OTHER PUBLICATIONS

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

(Continued)

*Primary Examiner* — Michael W Justice
(74) *Attorney, Agent, or Firm* — Slater Matsil, LLP

(57) ABSTRACT

In an embodiment, a method includes: receiving radar digital data; processing the radar digital data with a plurality of sine filters to generate a respective plurality of range-slow-time data, where each sine filter is associated with a respective range zone of a plurality of range zones; generating a first presence score based on a first range-slow-time data of the plurality of range-slow-time data, where the first range-slow-time data is associated with the first range zone; and when the first presence score is higher than a predetermined threshold, generating a plurality of synthetic antennas based on the first range-slow-time data, performing angle estimation based on the plurality of synthetic antennas to generate first probability values for a plurality of angle zones associated with the first range zone, and updating an occupancy grid map based on the first probability values.

21 Claims, 6 Drawing Sheets

(56) References Cited

U.S. PATENT DOCUMENTS

| | | | |
|---|---|---|---|
| 6,622,100 B2* | 9/2003 | Whitsitt | G01S 3/781 |
| | | | 702/116 |
| 6,636,174 B2 | 10/2003 | Arikan et al. | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |
| 7,479,920 B2* | 1/2009 | Niv | G01S 13/50 |
| | | | 342/191 |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |
| 8,228,382 B2 | 7/2012 | Pattikonda | |
| 8,421,669 B2* | 4/2013 | Sawa | G01S 13/9017 |
| | | | 342/25 R |
| 8,446,312 B2* | 5/2013 | Kanamoto | G01S 13/04 |
| | | | 342/149 |
| 8,497,805 B2 | 7/2013 | Rofougaran et al. | |
| 8,581,777 B2* | 11/2013 | Kanamoto | G01S 13/931 |
| | | | 342/158 |
| 8,648,745 B2* | 2/2014 | Kanamoto | G01S 3/74 |
| | | | 342/158 |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,172,132 B2 | 10/2015 | Kam et al. | |
| 9,182,476 B2 | 11/2015 | Wintermantel | |
| 9,202,105 B1 | 12/2015 | Wang et al. | |
| 9,229,102 B1 | 1/2016 | Wright et al. | |
| 9,413,079 B2 | 8/2016 | Kamgaing et al. | |
| 9,495,600 B2 | 11/2016 | Heu et al. | |
| 9,886,095 B2 | 2/2018 | Pothier | |
| 9,935,065 B1 | 4/2018 | Baheti et al. | |
| 10,048,366 B1* | 8/2018 | Hong | G01S 13/723 |
| 10,564,277 B2* | 2/2020 | Hong | G01S 13/003 |
| 10,628,917 B2* | 4/2020 | Watanabe | G01B 11/285 |
| 10,795,012 B2 | 10/2020 | Santra et al. | |
| 10,852,389 B2* | 12/2020 | Chang | G01S 7/40 |
| 10,948,580 B2* | 3/2021 | Yamanouchi | G01S 13/40 |
| 11,054,516 B2* | 7/2021 | Wu | G01S 7/354 |
| 11,099,253 B2* | 8/2021 | Kang | G01S 5/02521 |
| 11,099,267 B2* | 8/2021 | Wu | G01S 7/354 |
| 11,187,795 B2* | 11/2021 | Iwasa | G01S 13/42 |
| 11,474,225 B2* | 10/2022 | Dent | G01S 13/106 |
| 11,774,553 B2* | 10/2023 | Santra | G01S 7/412 |
| | | | 342/109 |
| 11,789,140 B2* | 10/2023 | Wang | G01S 13/538 |
| | | | 342/109 |
| 11,814,039 B2* | 11/2023 | Yershov | B60W 30/08 |
| 11,892,558 B2* | 2/2024 | Kim | G01S 13/42 |
| 11,933,909 B2* | 3/2024 | Kang | G01S 5/02521 |
| 11,965,955 B2* | 4/2024 | Cattle | G01S 13/345 |
| 12,146,978 B2* | 11/2024 | Iwasa | G01S 13/44 |
| 2002/0193971 A1* | 12/2002 | Whitsitt | G06V 10/255 |
| | | | 702/189 |
| 2003/0179127 A1 | 9/2003 | Wienand | |
| 2004/0178943 A1* | 9/2004 | Niv | G01S 13/935 |
| | | | 342/191 |
| 2004/0238857 A1 | 12/2004 | Beroz et al. | |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2010/0271254 A1* | 10/2010 | Kanamoto | G01S 13/931 |
| | | | 342/146 |
| 2011/0032142 A1* | 2/2011 | Sawa | G01S 13/9017 |
| | | | 342/25 R |
| 2011/0299433 A1 | 12/2011 | Darabi et al. | |
| 2012/0038506 A1* | 2/2012 | Kanamoto | G01S 13/584 |
| | | | 342/158 |
| 2012/0087230 A1 | 4/2012 | Guo et al. | |
| 2012/0092284 A1 | 4/2012 | Rofougaran et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0265486 A1 | 10/2012 | Klofer et al. | |
| 2012/0268314 A1 | 10/2012 | Kuwahara et al. | |
| 2012/0268316 A1* | 10/2012 | Kanamoto | G01S 13/584 |
| | | | 342/158 |
| 2012/0280900 A1 | 11/2012 | Wang et al. | |
| 2013/0027240 A1 | 1/2013 | Chowdhury | |
| 2013/0106673 A1 | 5/2013 | McCormack et al. | |
| 2013/0120191 A1* | 5/2013 | Zhang | H04B 7/088 |
| | | | 455/562.1 |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0324888 A1 | 10/2014 | Xie et al. | |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0325925 A1 | 11/2015 | Kamgaing et al. | |
| 2015/0346820 A1 | 12/2015 | Poupyrev et al. | |
| 2015/0348821 A1 | 12/2015 | Wanaga et al. | |
| 2015/0364816 A1 | 12/2015 | Murugan et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0135655 A1 | 5/2016 | Ahn et al. | |
| 2016/0146931 A1 | 5/2016 | Rao et al. | |
| 2016/0146933 A1 | 5/2016 | Rao et al. | |
| 2016/0178730 A1 | 6/2016 | Trotta et al. | |
| 2016/0187462 A1 | 6/2016 | Altus et al. | |
| 2016/0191232 A1 | 6/2016 | Subburaj et al. | |
| 2016/0223651 A1 | 8/2016 | Kamo et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 | 11/2016 | Poupyrev | |
| 2016/0320853 A1 | 11/2016 | Lien et al. | |
| 2016/0327633 A1 | 11/2016 | Kumar Y.B. et al. | |
| 2016/0334502 A1 | 11/2016 | Ali et al. | |
| 2016/0349845 A1 | 12/2016 | Poupyrev et al. | |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |
| 2017/0090014 A1 | 3/2017 | Subburaj et al. | |
| 2017/0090015 A1 | 3/2017 | Breen et al. | |
| 2017/0115377 A1 | 4/2017 | Giannini et al. | |
| 2017/0131395 A1 | 5/2017 | Reynolds et al. | |
| 2017/0139036 A1 | 5/2017 | Nayyar et al. | |

(56) References Cited

U.S. PATENT DOCUMENTS

| | | | |
|---|---|---|---|
| 2017/0141453 A1 | 5/2017 | Waelde et al. | |
| 2017/0170947 A1 | 6/2017 | Yang | |
| 2017/0176574 A1 | 6/2017 | Eswaran et al. | |
| 2017/0192847 A1 | 7/2017 | Rao et al. | |
| 2017/0201019 A1 | 7/2017 | Trotta | |
| 2017/0212597 A1 | 7/2017 | Mishra | |
| 2017/0364160 A1 | 12/2017 | Malysa et al. | |
| 2018/0046255 A1 | 2/2018 | Rothera et al. | |
| 2018/0071473 A1 | 3/2018 | Trotta et al. | |
| 2018/0101239 A1 | 4/2018 | Yin et al. | |
| 2018/0189927 A1* | 7/2018 | Watanabe | G01C 21/3881 |
| 2019/0079175 A1* | 3/2019 | Yamanouchi | G01S 13/40 |
| 2019/0094334 A1* | 3/2019 | Chang | H04B 1/713 |
| 2019/0219687 A1 | 7/2019 | Baheti et al. | |
| 2019/0235068 A1* | 8/2019 | Hong | G01S 13/003 |
| 2019/0285738 A1* | 9/2019 | Iwasa | G01S 7/285 |
| 2019/0324133 A1* | 10/2019 | Hong | G01S 13/42 |
| 2020/0150256 A1* | 5/2020 | Dent | G01S 7/282 |
| 2020/0158861 A1* | 5/2020 | Cattle | G01S 13/345 |
| 2020/0191939 A1* | 6/2020 | Wu | G01S 7/354 |
| 2020/0191940 A1* | 6/2020 | Wu | G01S 13/931 |
| 2020/0408878 A1* | 12/2020 | Liang | G01S 7/354 |
| 2021/0080542 A1* | 3/2021 | Kim | H01Q 3/40 |
| 2021/0311180 A1* | 10/2021 | Wang | G01S 13/538 |
| 2021/0354690 A1* | 11/2021 | Yershov | B60W 30/08 |
| 2022/0003834 A1* | 1/2022 | Iwasa | G01S 7/285 |
| 2023/0051731 A1* | 2/2023 | Dent | G01S 13/106 |
| 2023/0408649 A1* | 12/2023 | Santra | G01S 7/417 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chioukh, Lydia et al., "Noise and Sensitivity of Harmonic Radar Architecture for Remote Sensing and Detection of Vital Signs", IEEE Transactions on Microwave Theory and Techniques, vol. 62, No. 9, Sep. 2014, pp. 1847-1855.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Gigie, Andrew et al., "Novel Approach for Vibration Detection Using Indented Radar", Progress in Electromagnetic Research C, vol. 87, Oct. 4, 2018, pp. 147-162.

Gouveia, Carolina et al., "A Review on Methods for Random Motion Detection and Compensation in Bio-Radar Systems", Sensors, MDPI, Jan. 31, 2019, 17 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Gu, Changzhan et al., "Deep Neural Network based Body Movement Cancellation for Doppler Radar Vital Sign Detection", IEEE MTT-S International Wireless Symposium (IWS) May 19-22, 2019, 3 pages.

Gu, Changzhan, "Short-Range Noncontact Sensors for Healthcare and Other Emerging Applications: A Review", Sensors, MDPI, Jul. 26, 2016, 24 pages.

Gu, Changzhan et al., "From Tumor Targeting to Speed Monitoring", IEEE Microwave Magazine, ResearchGate, Jun. 2014, 11 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Hu, Wei et al., "Noncontact Accurate Measurement of Cardiopulmonary Activity Using a Compact Quadrature Doppler Radar Sensor", IEEE Transactions on Biomedical Engineering, vol. 61, No. 3, Mar. 2014, pp. 725-735.

Immoreev, I. Ya., "Ultrawideband Radars: Features and Capabilities", Journal of Communications Technology and Electronics, ISSN: 1064-2269, vol. 54, No. 1, Feb. 8, 2009, pp. 1-26.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWR1xxx Power Management Optimizations—Low Cost LC Filter Solution," Application Report SWRA577, Texas Instruments, Oct. 2017, 19 pages.

Kishore, N. et al., "Millimeter Wave Antenna for Intelligent Transportation Systems Application", Journal of Microwaves, Optoelectronics and Electromagnetic Applications, vol. 17, No. 1, Mar. 2018, pp. 171-178.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz "Phased Array Calibration Procedures Based on Measured Element Patterns", 2001 Eleventh International Conference on Antennas and Propagation, IEEE Conf., Publ. No. 480, Apr. 17-20, 2001, 4 pages.

Li, Changzhi et al., "A Review on Recent Advances in Doppler Radar Sensors for Noncontact Healthcare Monitoring", IEEE Transactions on Microwave Theory and Techniques, vol. 61, No. 5, May 2013, pp. 2046-2060.

Li, Changzhi et al., "A Review on Recent Progress of Portable Short-Range Noncontact Microwave Radar Systems", IEEE Transactions on Microwave Theory and Techniques, vol. 65, No. 5, May 2017, pp. 1692-1706.

(56) References Cited

OTHER PUBLICATIONS

Li, Changzhi et al., "Random Body Movement Cancellation in Doppler Radar Vital Sign Detection", IEEE Transactions on Microwave Theory and Techniques, vol. 56, No. 12, Dec. 2008, pp. 3143-3152.

Li, Changzhi et al., "Robust Overnight Monitoring of Human Vital Signs by a Non-contact Respiration and Heartbeat Detector", IEEE Proceedings of the 28th EMBS Annual International Conference, FrA05.5, Aug. 30-Sep. 3, 2006, 4 pages.

Li, Changzhi "Vital-sign monitoring on the go", Sensors news and views, www.nature.com/naturelectronics, Nature Electronics, vol. 2, Jun. 2019, 2 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi: 10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Massagram, Wansuree et al., "Assessment of Heart Rate Variability and Respiratory Sinus Arrhythmia via Doppler Radar", IEEE Transactions on Microwave Theory and Techniques, vol. 57, No. 10, Oct. 2009, pp. 2542-2549.

Mercuri, Marco et al., "Vital-sign monitoring and spatial tracking of multiple people using a contactless radar-based sensor", Nature Electronics, vol. 2, Articles, https://doi.org/10.1038/s41928-019-0258-6, Jun. 2019, 13 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Mostov, K., et al., "Medical applications of shortwave FM radar: Remote monitoring of cardiac and respiratory motion", Am. Assoc. Phys. Med., 37(3), Mar. 2010, pp. 1332-1338.

Oguntala, G et al., "Indoor location identification technologies for real-time IoT-based applications: an inclusive survey", Elsevier Inc., http://hdl.handle.net/10454/16634, Oct. 2018, 21 pages.

Peng, Zhengyu et al., "A Portable FMCW Interferometry Radar with Programmable Low-IF Architecture for Localization, ISAR Imaging, and Vial Sign Tracking", IEEE Transactions on Microwave Theory and Techniques, Dec. 15, 2016, 11 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

Richards, Mark A., "Fundamentals of Radar Signal Processing", McGraw Hill Electronic Engineering, ISBN: 0-07-144474-2, Jun. 2005, 93 pages.

Sakamoto, Takuya et al., "Feature-Based Correlation and Topological Similarity for Interbeat Interval Estimation Using Ultrawideband Radar", IEEE Transactions on Biomedical Engineering, vol. 63, No. 4, Apr. 2016, pp. 747-757.

Santra, Avik et al., "Short-range multi-mode continuous-wave radar for vital sign measurement and imaging", ResearchGate, Conference Paper, Apr. 2018, 6 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.

Singh, Aditya et al., "Data-Based Quadrature Imbalance Compensation for a CW Doppler Radar System", https://www.researchgate.net/publication/258793573, IEEE Transactions on Microwave Theory and Techniques, Apr. 2013, 7 pages.

Suleymanov, Suleyman, "Design and Implementation of an FMCW Radar Signal Processing Module for Automotive Applications," Master Thesis, University of Twente, Aug. 31, 2016, 64 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Tu, Jianxuan et al., "Fast Acquisition of Heart Rate in Noncontact Vital Sign Radar Measurement Using Time-Window-Variation Technique", IEEE Transactions on Instrumentation and Measurement, vol. 65, No. 1, Jan. 2016, pp. 112-122.

Vinci, Gabor et al., "Microwave Interferometer Radar-Based Vital Sign Detection for Driver Monitoring Systems", IEEE MTT-S International Conference on Microwaves for Intelligent Mobility, Apr. 27-29, 2015, 4 pages.

Vinci, Gabor et al., "Six-Port Radar Sensor for Remote Respiration Rate and Heartbeat Vital-Sign Monitoring", IEEE Transactions on Microwave Theory and Techniques, vol. 61, No. 5, May 2013, pp. 2093-2100.

Wang, Fu-Kang et al., "Wrist Pulse Rate Monitor Using Self-Injection-Locked Radar Technology", Biosensors, MDPI, Oct. 26, 2016, 12 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, 1974, pp. 18-34.

Will, Christoph et al., "Advanced Template Matching Algorithm for Instantaneous Heartbeat Detection using Continuous Wave Radar Systems", ResearchGate, May 2017, 5 pages.

Will, Christoph et al., "Human Target Detection, Tracking, and Classification Using 24-GHz FMCW Radar", IEEE Sensors Journal, vol. 19, No. 17, Sep. 1, 2019, pp. 7283-7299.

Will, Christoph et al., "Local Pulse Wave Detection using Continuous Wave Radar Systems", IEEE Journal of Electromagnetics, RF and Microwaves in Medicine and Biology, Oct. 25, 2017, 9 pages.

Will, Christoph et al., "Radar-Based Heart Sound Detection", Scientific Reports, www.nature.com/scientificreports, Jul. 26, 2018, 15 pages.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.

Cho, Hyun-Woong et al., "Complex-Valued Channel Attention and Application in Ego-Velocity Estimation With Automotive Radar", IEEE Access, Digital Object Identifier 10.1109/Access.2021.3054368, Jan. 25, 2021, 11 pages.

Stadelmayer, Thomas et al., "Data-Driven Radar Processing Using a Parametric Convolutional Neural Network for Human Activity Classification", IEEE Sensors Journal, vol. 21, No. 17, Sep. 2021, 12 pages.

Stadelmayer, Thomas et al., "Improved Target Detection and Feature Extraction using a Complex-Valued Adaptive Sine Filter on Radar Time Domain Data", EUSIPCO 29th European Signal Processing Conference (EUSIPCO), ISBN: 978-9-0827-9706-0, Aug. 23-27, 2021, 5 pages.

\* cited by examiner

Prior Art

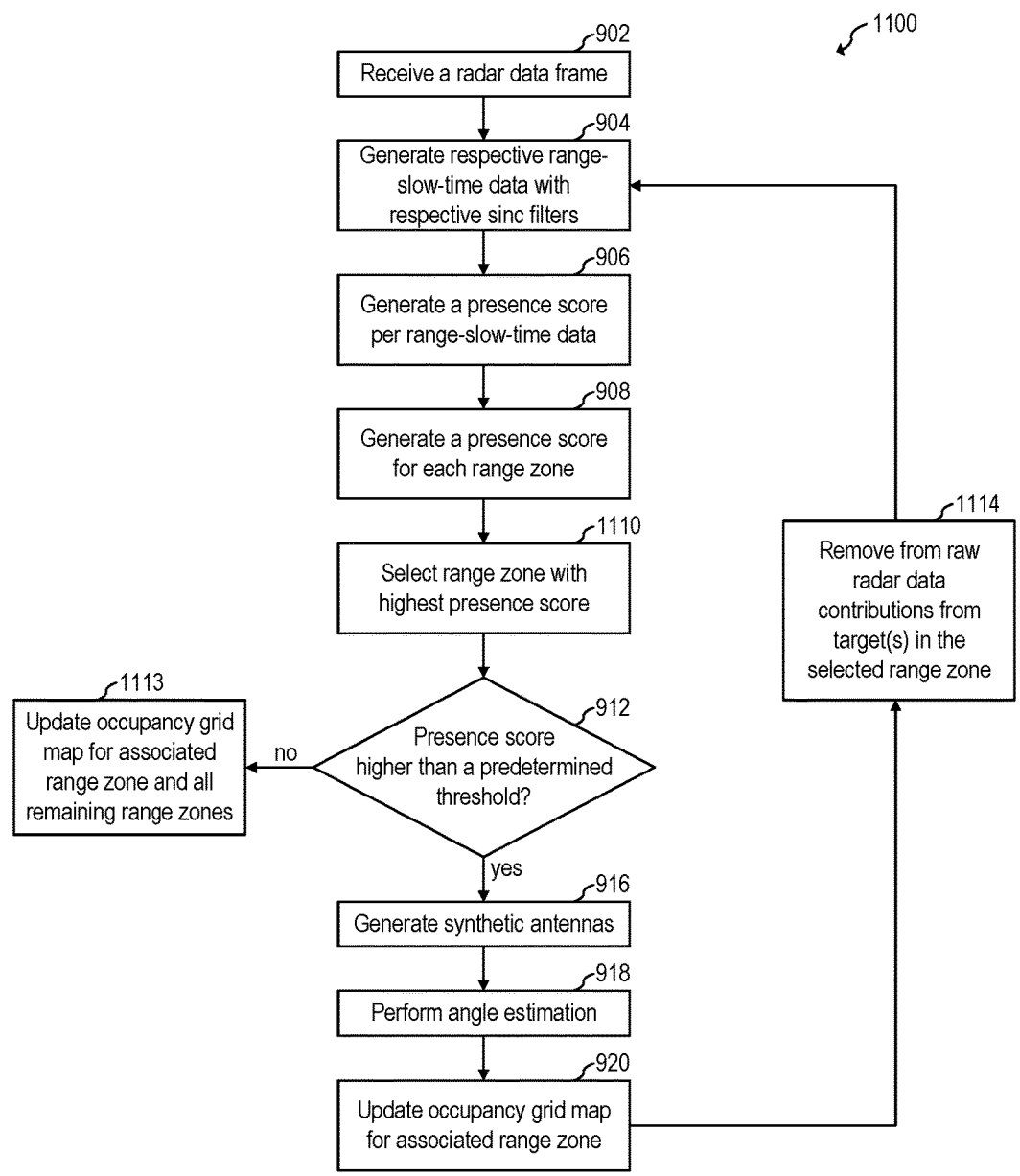

RADAR-BASED SEGMENTED PRESENCE DETECTION

TECHNICAL FIELD

The present disclosure relates generally to an electronic system and method, and, in particular embodiments, to a radar-based segmented presence detection.

BACKGROUND

Applications in the millimeter-wave frequency regime have gained significant interest in the past few years due to the rapid advancement in low-cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at e.g., 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmitting antenna for transmitting the radio-frequency (RF) signal, and a receiving antenna for receiving the reflected RF signal, as well as the associated RF circuits used to generate the transmitted signal and to receive the RF signal. In some radar systems, multiple antennas may be used to implement directional beams using phased array techniques. A multiple-input and multiple-output (MIMO) configuration with multiple chipsets can be used to perform coherent and non-coherent signal processing.

FIG. 1 illustrates a flow chart of exemplary method 100 for target detection based on radar data.

During step 102, a range fast Fourier transform (FFT) is performed on the raw radar data for each receiving antenna of the radar. For example, a windowed FFT having a length of a chirp is calculated for each of the chirps in a frame. The result of the range FFT is an indication of energy distribution across ranges for each chirp.

During step 104, for each receiving antenna, a Doppler FFT is performed on the range FFT data. For example, an FFT is calculated across each range bin over a number of consecutive periods to extract Doppler information. The result of step 104 is a range Doppler maps (also known are range-Doppler image or RDI) for each of the receiving antennas.

During step 106, two-dimensional (2D) moving target indication (MTI) filtering is applied to each RDI to generate filtered images. Performing MTI filtering serves to discriminate a target against the clutter (e.g., only targets with, e.g., high motion are retained as their energy varies across Doppler images). Thus, after 2D MTI filtering, a target may be identifiable in the filtered RDIs while information about the background may be partially or fully removed from the filtered RDIs.

During step 108, 2D digital beamforming is applied to transform the filtered RDIs associated with each of the receiving antennas into a 2D range-angle image (RAI).

During step 110, target detection is performed using an order statistics (OS) constant false alarm rate (CFAR) (OS-CFAR) detector, in which the CFAR detector compares the power levels of the RAI with a threshold, and points above the threshold are labeled as targets while points below the threshold are labeled as non-targets.

SUMMARY

In accordance with an embodiment, a method includes: receiving radar digital data; processing the radar digital data with a plurality of sine filters to generate a respective plurality of range-slow-time data, where each sine filter is associated with a respective range zone of a plurality of range zones; generating a first presence score indicative of a probability of target presence in a first range zone of the plurality of range zones based on a first range-slow-time data of the plurality of range-slow-time data, where the first range-slow-time data is associated with the first range zone; and when the first presence score is higher than a predetermined threshold, generating a plurality of synthetic antennas based on the first range-slow-time data, performing angle estimation based on the plurality of synthetic antennas to generate first probability values for a plurality of angle zones associated with the first range zone, and updating an occupancy grid map indicative of a probability of target presence in each angle zone of each of the plurality of range zones based on the first probability values.

In accordance with an embodiment, a millimeter-wave radar system includes: a millimeter-wave radar sensor configured to transmit radar signals, receive reflected radar signals, and generate radar digital data based on the reflected radar signals; and a processing system configured to: process the radar digital data with a plurality of sine filters to generate a respective plurality of range-slow-time data, where each sine filter is associated with a respective range zone of a plurality of range zones, generate a first presence score indicative of a probability of target presence in a first range zone of the plurality of range zones based on a first range-slow-time data of the plurality of range-slow-time data, where the first range-slow-time data is associated with the first range zone, and when the first presence score is higher than a predetermined threshold, generate a plurality of synthetic antennas based on the first range-slow-time data, perform angle estimation based on the plurality of synthetic antennas to generate first probability values for a plurality of angle zones associated with the first range zone, and update an occupancy grid map indicative of a probability of target presence in each angle zone of each of the plurality of range zones based on the first probability values.

In accordance with an embodiment, a method includes: receiving a first frame of radar digital data, the first frame including Q chirps, Q being aa positive integer greater than 1, the first frame including first and second data from first and second receiving antennas of a millimeter-wave radar system, respectively; processing the first data with a first plurality of sine filters to generate a respective first plurality of range-slow-time data, where each sine filter of the first plurality of sine filters is associated with a respective range zone of a plurality of range zones; processing the second data with a second plurality of sine filters to generate a respective second plurality of range-slow-time data, where each sine filter of the second plurality of sine filters has a corresponding sine filter of the first plurality of sine filters; generating a first presence score indicative of a probability of target presence in a first range zone of the plurality of range zones based on a first range-slow-time data of the first plurality of range-slow-time data or on a second range-slow-time data of the second plurality of range-slow-time data, where the first range-slow-time data is associated with the first range zone and the second range-slow-time data is associated with the first range zone; and when the first presence score is higher than a predetermined threshold, generating a plurality of synthetic antennas based on the first and second range-slow-time data, performing angle estimation based on the plurality of synthetic antennas to generate first probability values for a plurality of angle zones associated with the first range zone, and updating an occupancy grid map indicative of a probability of target presence in each angle zone of each of the plurality of range zones based on the first probability values.

BRIEF DESCRIPTION OF THE DRAWINGS

For a more complete understanding of the present invention, and the advantages thereof, reference is now made to the following descriptions taken in conjunction with the accompanying drawings, in which:

FIG. 10 shows a flow chart of an embodiment method for an updating occupancy grid map, according to an embodiment of the present invention; and FIG. 11 shows a flow chart of an embodiment method for target presence detection, according to an embodiment of the present invention.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in specific contexts, e.g., a millimeter-wave radar system capable of providing segmented presence detection, e.g., for human target detection. Embodiments of the present invention may be used for other types of targets (e.g., animals, robots, etc.). Some embodiments may operate in regimes different from millimeter-wave.

In an embodiment of the present invention, a plurality of non-overlapping sine filters is used for each receiving antenna of a millimeter-wave radar to generate a corresponding plurality of time-domain I/Q data. A presence score is determined based on slow-time data from the sine filters to determine target presence at the ranges corresponding to the sine filters. Angle estimation is determined for the ranges in which a target has been detected to determine the range-angle zone at which the target is present. In some embodiments, using segmented target presence advantageously allows for accurate target detection while minimizing computational complexity. In some embodiments, successive interference cancellation may be used to advantageously perform target detection for ranges associated with weak targets as well as to prevent further processing for ranges in which a target is not detected. In some embodiments, temporal modeling is used to track target presence at each range-angle zone, which may advantageously avoid false positives.

Figure 1:
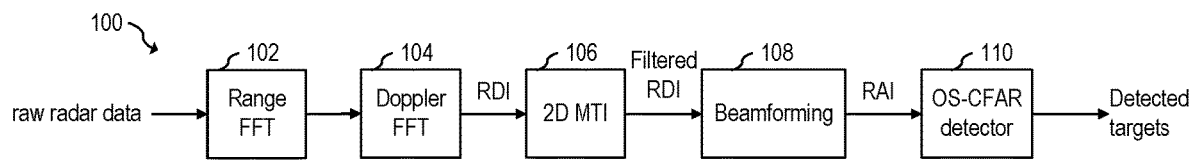
FIG. 1 illustrates a flow chart of an exemplary method for target detection based on radar data.
Figure 2:
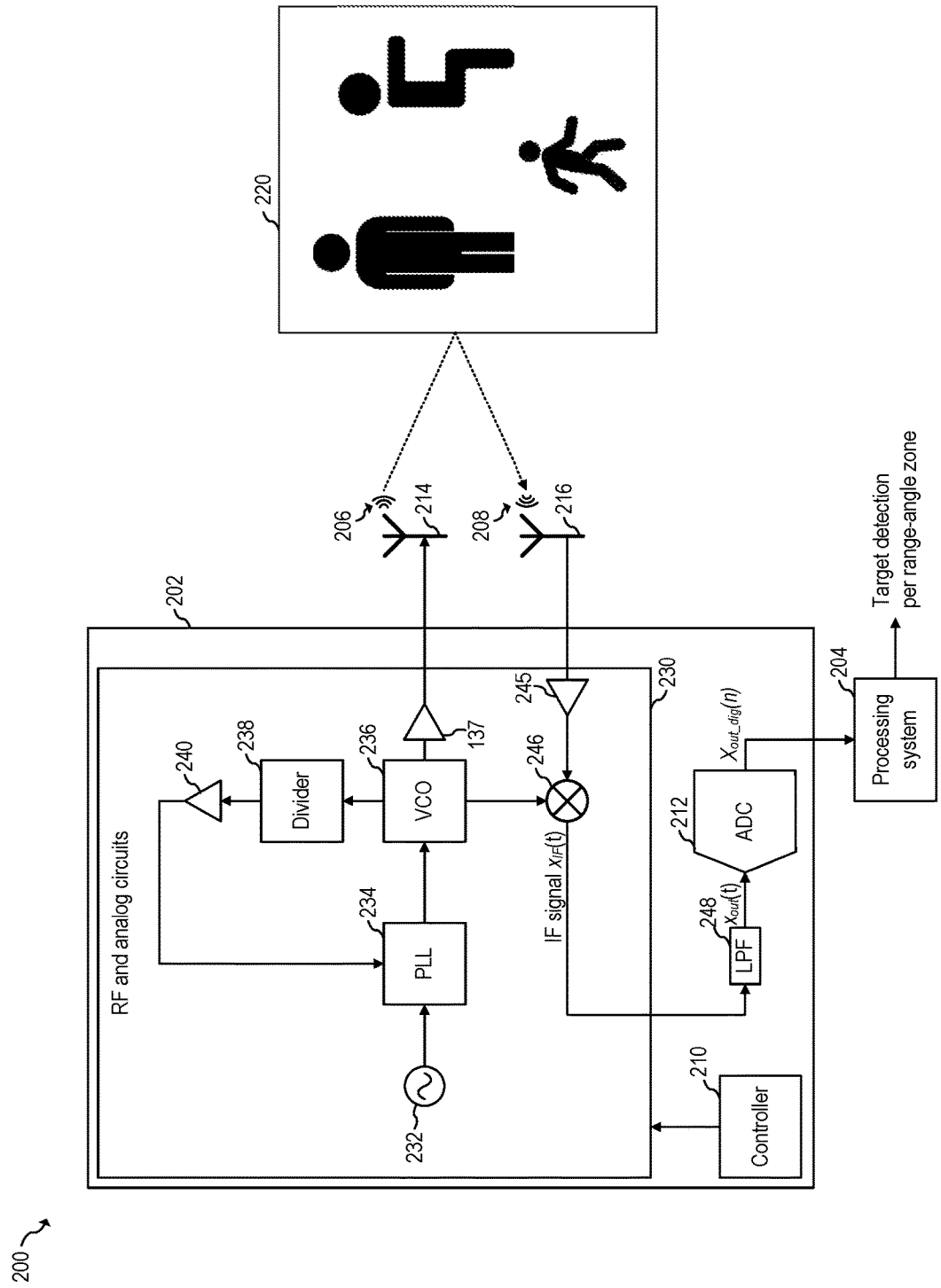
FIG. 2 shows a schematic diagram of a millimeter-wave radar system, according to an embodiment of the present invention.

FIG. 2 shows a schematic diagram of millimeter-wave radar system 200, according to an embodiment of the present invention. Millimeter-wave radar system 200 includes millimeter-wave radar sensor 202 and processing system 204.

During normal operation, millimeter-wave radar sensor 202 operates as a frequency-modulated continuous-wave (FMCW) radar sensor and transmits a plurality of TX radar signals 206, such as chirps, e.g., organized in frames, towards scene 220 using one or more transmitter (TX) antenna(s) 214. The radar signals 206 are generated using RF and analog circuits 230. The radar signals 206 may be, e.g., in the 20 GHz to 122 GHz range. Other frequencies may also be used.

The objects in scene 220 may include one or more static or moving objects, such as tables, walls, chairs, etc., idle and moving humans and animals, as well as periodically-moving objects, such as rotating fans. Other objects may also be present in scene 220.

The radar signals 206 are reflected by objects in scene 220. The reflected radar signals 208, which are also referred to as the echo signal, are received by a plurality of receiving (RX) antennas 216. RF and analog circuits 230 processes the received reflected radar signals 208 using, e.g., band-pass filters (BPFs), low-pass filters (LPFs), mixers, low-noise amplifier (LNA), and/or intermediate frequency (IF) amplifiers in ways known in the art to generate an analog signal $x_{out}(t)$ per receiving antenna 216.

The analog signals $x_{out}(t)$ are converted to raw digital data $x_{out\_dig}(n)$ using analog-to-digital converter (ADC) 212. In some embodiments, the raw digital data $x_{out\_dig}(n)$ is processed by processing system 204 to determine whether a particular range-angle zone includes a target.

Controller 210 controls one or more circuits of millimeter-wave radar sensor 202, such as RF and analog circuit 230 and/or ADC 212. Controller 210 may be implemented, e.g., as a custom digital or mixed signal circuit, for example. Controller 210 may also be implemented in other ways, such as using a general-purpose processor or controller, for example. In some embodiments, processing system 204 implements a portion or all of controller 210.

Processing system 204 may be implemented with a general-purpose processor, controller or digital signal processor (DSP) that includes, for example, combinatorial circuits coupled to a memory. In some embodiments, processing system 204 may be implemented as an application specific integrated circuit (ASIC). In some embodiments, processing system 104 may be implemented with an ARM, RISC, or x86 architecture, for example. In some embodiments, processing system 204 may include an artificial intelligence (AI) accelerator. Some embodiments may use a combination of hardware accelerator and software running on a DSP or general-purpose microcontroller. Other implementations are also possible.

In some embodiments, millimeter-wave radar sensor 202 and a portion or all of processing system 204 may be implemented inside the same integrated circuit (IC). For example, in some embodiments, millimeter-wave radar sensor 202 and a portion or all of processing system 204 may be implemented in respective semiconductor substrates that are integrated in the same package. In other embodiments, millimeter-wave radar sensor 202 and a portion or all of processing system 204 may be implemented in the same monolithic semiconductor substrate. In some embodiments, millimeter-wave radar sensor 202 and processing system 204 are implemented in respective integrated circuits. In some embodiments, a plurality of integrated circuits is used to implement millimeter-wave radar sensor 202. In some embodiments, a plurality of integrated circuits is used to implement processing system 204. Other implementations are also possible.

As a non-limiting example, RF and analog circuits 230 may be implemented, e.g., as shown in FIG. 2. During normal operation, voltage-controlled oscillator (VCO) 236 generates radar signals, such as a linear frequency chirps (e.g., from 57 GHz to 64 GHz, or from 76 GHz to 77 GHz), which are transmitted by transmitting antenna 214. The VCO 236 is controlled by PLL 234, which receives a reference clock signal (e.g., 80 MHz) from reference oscillator 232. PLL 234 is controlled by a loop that includes frequency divider 238 and amplifier 240. Amplifier 237 may be used to drive transmitting antenna 214.

The TX radar signals 206 transmitted by transmitting antenna 214 are reflected by objects in scene 220 and received by receiving antennas 216. The echo received by receiving antennas 216 are mixed with a replica of the signal transmitted by transmitting antenna 214 using respective mixers 246 to produce respective intermediate frequency (IF) signals $x_{IF}(t)$ (also known as beat signals). In some embodiments, the beat signals $x_{IF}(t)$ have a bandwidth between 10 kHz and 1 MHz. Beat signals with a bandwidth lower than 10 kHz or higher than 1 MHz is also possible. Respective amplifiers 245 may be used to receive the reflected radar signals from antennas 216.

Beat signals $x_{IF}(t)$ may be respectively filtered with respective low-pass filters (LPFs) 248 and then sampled by ADC 212. ADC 212 is advantageously capable of sampling the filtered beat signals $x_{out}(t)$ with a sampling frequency that is much smaller than the frequency of the signal received by receiving antennas 216. Using FMCW radars, therefore, advantageously allows for a compact and low-cost implementation of ADC 212, in some embodiments.

The raw digital data $x_{out\_dig}(n)$ (also referred to as raw radar data), which in some embodiments include the digitized version of the filtered beat signals $x_{out}(t)$, is (e.g., temporarily) stored, e.g., in matrices of $N_c \times N_s$ per receiving antenna 216, where $N_c$ is the number of chirps considered in a frame and $N_s$ is the number of transmit samples per chirp, for further processing by processing system 204.

In some embodiments, ADC 212 is a 12-bit ADC with multiple inputs. ADCs with higher resolution, such as 14-bits or higher, or with lower resolution, such as 10-bits, or lower, may also be used. In some embodiments, an ADC per receiver antenna may be used. Other implementations are also possible.

As shown in FIG. 2, only one receiving antenna 216 is illustrated for clarity purposes. In some embodiments, millimeter-wave radar system 200 includes two receiving antennas 216. In some embodiments, millimeter-wave radar system 200 includes three receiving antennas 216 (e.g., arranged in an L-shape, e.g., to capture azimuth and elevation, in addition to range). Other implementations are also possible.

Figure 3:
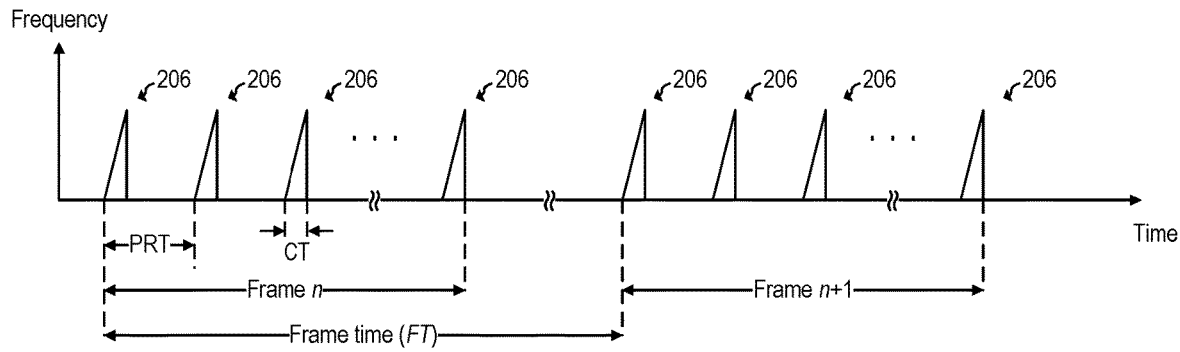
FIG. 3 illustrates a sequence of chirps transmitted by the TX antenna of FIG. 2, according to an embodiment of the present invention.

FIG. 3 illustrates a sequence of chirps 206 transmitted by TX antenna 214, according to an embodiment of the present invention. As shown by FIG. 3, chirps 206 are organized in a plurality of frames (also referred to as physical frames) and may be implemented as up-chirps. Some embodiments may use down-chirps or a combination of up-chirps and down-chirps, such as up-down chirps and down-up chirps. Other waveform shapes may also be used.

As shown in FIG. 3, each frame may include a plurality of chirps 206 (also referred to, generally, as pulses). For example, in some embodiments, the number of chirps in a frame is 32. Some embodiments may include more than 32 chirps per frame, such as 64 chirps, 96 chirps, 128 chirps, or more, or less than 32 chirps per frame, such as 16 chirps, 8 chirps, or less.

In some embodiments, frames are repeated every FT time. In some embodiments, FT time is 50 ms. A different FT time may also be used, such as more than 50 ms, such as 60 ms, 100 ms, 200 ms, or more, or less than 50 ms, such as 45 ms, 40 ms, or less.

In some embodiments, the FT time is selected such that the time between the beginning of the last chirp of frame n and the beginning of the first chirp of frame n+1 is equal to PRT. Other embodiments may use or result in a different timing.

The time between chirps of a frame is generally referred to as pulse repetition time (PRT). In some embodiments, the PRT is 5 ms. A different PRT may also be used, such as less than 5 ms, such as 4 ms, 2 ms, 0.5 ms, or less, or more than 5 ms, such as 6 ms, or more.

The duration of the chirp (from start to finish) is generally referred to as chirp time (CT). In some embodiments, the chirp time may be, e.g., 64 μs. Higher chirp times, such as 128 μs, or higher, may also be used. Lower chirp times, may also be used.

In some embodiments, the chirp bandwidth may be, e.g., 4 GHz. Higher bandwidth, such as 6 GHz or higher, or lower bandwidth, such as 2 GHz, 1 GHz, or lower, may also be possible.

In some embodiments, the sampling frequency of millimeter-wave radar sensor 202 may be, e.g., 1 MHz. Higher sampling frequencies, such as 2 MHz or higher, or lower sampling frequencies, such as 500 kHz or lower, may also be possible.

In some embodiments, the number of samples used to generate each chirp may be, e.g., 64 samples. A higher number of samples, such as 128 samples, or higher, or a lower number of samples, such as 32 samples or lower, may also be used to generate each chirp.

Figure 4:
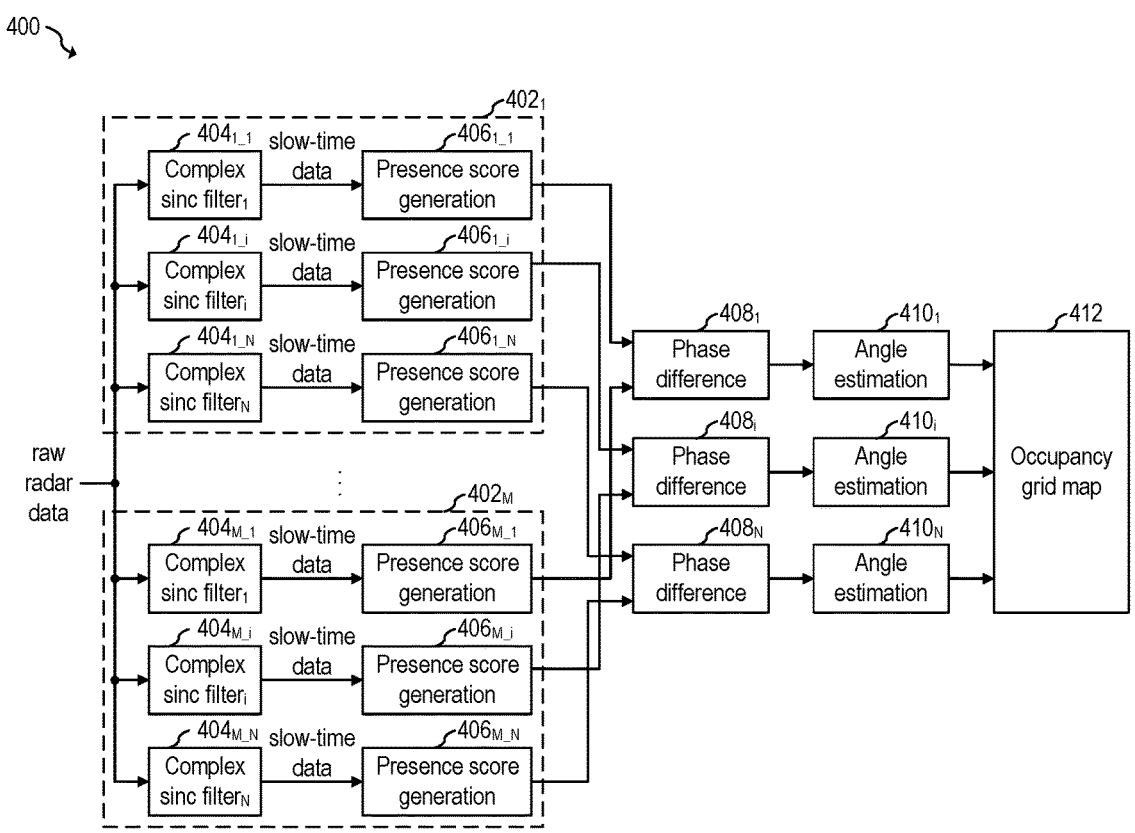
FIG. 4 shows a flow chart of an embodiment method for target detection based on radar data, according to an embodiment of the present invention.

FIG. 4 shows a block diagram of embodiment method 400 for target detection based on radar data, according to an embodiment of the present invention. In some embodiments, method 400 may be implemented by processing system 204. FIG. 4 may be understood in view of FIGS. 5A, 5B, 6A, 6B, 7A, and 7B.

As shown in FIG. 4, method 400 includes range presence detector 402 per receiving antenna 216. Each range presence detector 402 includes N non-overlapping complex sine filters 404 and respective presence score generator 406. For clarity purposes, the description below assumes that M is equal to 2 (the processing is performed with data from two receiving antennas 216).

In some embodiments, each filter $404_{x\_i}$ is identical. For example, in some embodiments, each of filters $404_{1\_1}$ to $404_{M\_1}$ (also referred in FIG. 4 as complex sine filter 1) are equal and correspond to the same range zone. For example, FIGS. 5A and 5B illustrate the frequency response of 4 non-overlapping sine filters 404, and associated range zones, respectively, according to an embodiment of the present invention.

Figure 5A:
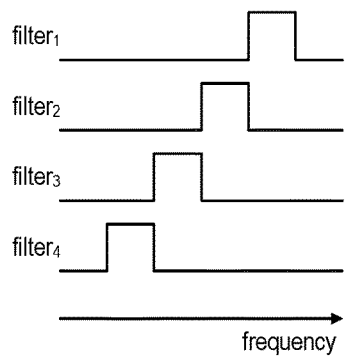
FIGS. 5A and 5B illustrate the frequency response of four non-overlapping sine filters, and associated range zones, respectively, according to an embodiment of the present invention.
Figure 5B:
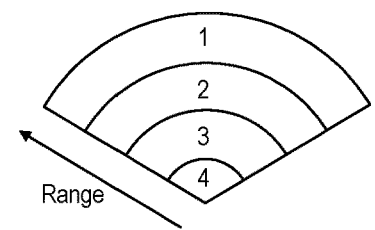

As shown in FIG. 5A, in some embodiments, each range presence detector 402 includes 4 non-overlapping complex sine filters 404, where each sine filter 404 is associated with a different range zone. For example, in some embodiments, $filter_1$ is associated with range zone 1, $filter_2$ is associated with range zone 2, $filter_3$ is associated with range zone 3, and $filter_3$ is associated with range zone 4, as illustrated in FIG. 5B.

In some embodiments, using complex sine filters instead of a range FFT advantageously allows for detecting targets in a range zone with lower computational complexity.

Figure 6A:
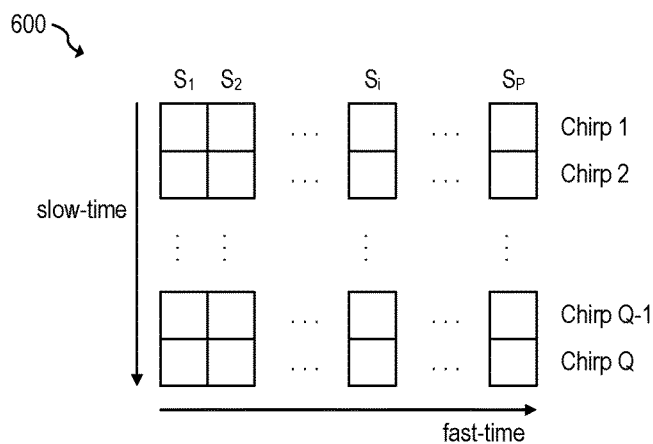
FIGS. 6A and 6B illustrate possible outputs of a complex sine filter of FIG. 4, according to embodiments of the present invention.

In some embodiments, the output of each sine filter 404 is filtered time-domain data. For example, FIG. 6A illustrates time-domain data 600 generated by a complex sine filter 404, according to an embodiment of the present invention. As shown in FIG. 6A, in an embodiment in which each frame includes Q chirps and each chirp includes P samples, complex sine filter 404 generates a matrix that includes P×Q complex I/Q data points.

In some embodiments, a complex sine filter 404 further processes the time-domain data 600 to generate slow-time data, which may advantageously reduce the computational complexity and memory usage (e.g., since only the accumulated data 650 is stored instead of the data 600, and the computation is performed using such smaller data set) while retaining enough information for target detection in the respective range zone. For example, in some embodiments, the slow-time data (also referred to as range-slow-time data) generated by a complex sine filter 404 includes Q complex I/Q data points (Q being the number of chirps per frame), each including the accumulated energy of the respective chirp of the frame.

In some embodiments, each complex sine filter 404 generates processed fast time data that retains range specific information while keeping the slow time data intact.

In some embodiments, each complex sine filter 404 includes a sine filter with a filter length (also know as number of taps) of P, and a pointwise multiplication occurs with a subsequent summation of all resulting complex values.

Figure 6B:
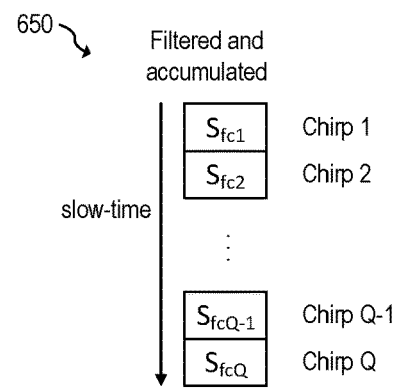

In some embodiments, each complex sine filter 404 generates the range-slow-time data by multiplying a sine filter times a chirp, and accumulating the result for each of the Q chirps in a frame. For example, FIG. 6B illustrates complex range-slow-time data generated by a complex sine filter 404, according to an embodiment of the present invention. As shown in FIG. 6B, in an embodiment in which each frame includes Q chirps, complex sine filter 404 may generate slow-time data 650, which includes Q complex data points. In some embodiments, filtered data point $S_{fc1}$ may be given by $$S_{fc1} = \sum_{j=1}^{P} S_j^1. \quad (1)$$

where P represents the number of samples per chirp and $S_j^1$ represents sample j of chirp 1.

More generally, filtered data point $S_{fci}$ may be given by $$S_{fci} = \sum_{j=1}^{P} S_j^i. \quad (2)$$

where $S_j^i$ represents sample j of chirp i, where i is an integer between 1 and Q.

As shown in FIG. 4, in some embodiments, for each sine filter 404, a presence score generator 406 determines a score indicative of (e.g., the probability of) whether a target is present in the range zone associated with the respective sine filter 404. For example, in some embodiments, presence score generator 406 determines the presence score based on the covariance matrix of the range-slow-time data (e.g., 600 or 650) generated by the associated sine filter 404. For example, in some embodiments, the covariance matrix of the range-slow-time data (e.g., 650) generated by the sine filter 404 is indicative of how much movement a target experienced in slow-time in the range zone associated with the respective sine filter 404. The norm of such covariance matrix is indicative of the spread of such movement (e.g., indicative of the standard deviation). For example, a higher norm of the covariance matrix is indicative of a higher probability of a human being present at the range zone associated with the respective sine filter 404 than a lower norm of the covariance matrix. Thus, in some embodiments, the presence score generated by each presence score generator 406 is the norm of the covariance of the range-slow-time data (e.g., 650) generated by the respective sine filter 404.

In some embodiments, determining the presence score by taking the norm of the covariance matrix of the range-slow-time data generated by the associated sine filter 404 advantageously results in better target detection (e.g., compared to using the signal energy-amplitude only) due to better signal-to-noise ratio (SNR) of the covariance matrix. In some embodiments, the use of the norm of the covariance matrix of the range-slow-time data to detect targets also advantageously removes static targets (e.g., such as walls) from the detection (i.e., static targets are not detected) as static targets do not move and, therefore, result in a lower norm.

In some embodiments, a target is detected as present when the presence score (e.g., the norm of the covariance matrix) is higher than a predetermined threshold.

In some embodiments, method 400 also includes N phase difference generators 408 per pair of antennas 216 (N being the number of complex sine filters 404 per antenna 216). For example, in an embodiment that includes 3 receiving antennas 216, method 400 may include 3*N phase difference generators 408.

In some embodiments, each phase difference generator 408 corresponds to a particular range zone. For example, phase difference generator $408_1$ corresponds to the range zone associated with complex sine filter$_1$, phase difference generator $408_i$ corresponds to the range zone associated with complex sine filter$_i$, and phase difference generator $408_N$ corresponds to the range zone associated with complex sine filter$_N$.

In some embodiments, each phase difference generator 408 generates Q synthetic antennas (Q being the number of chirps per frame) based on the phase differences between range slow-time data (e.g., 650) from associated sine filters 404. For example, in some embodiments, the Q synthetic antennas are generated by determining the cumulative phase difference for the Q phase differences. For example, FIG. 7A illustrates a method for determining Q cumulative phase differences (corresponding to the Q synthetic antennas), according to an embodiment of the present invention.

Figure 7A:
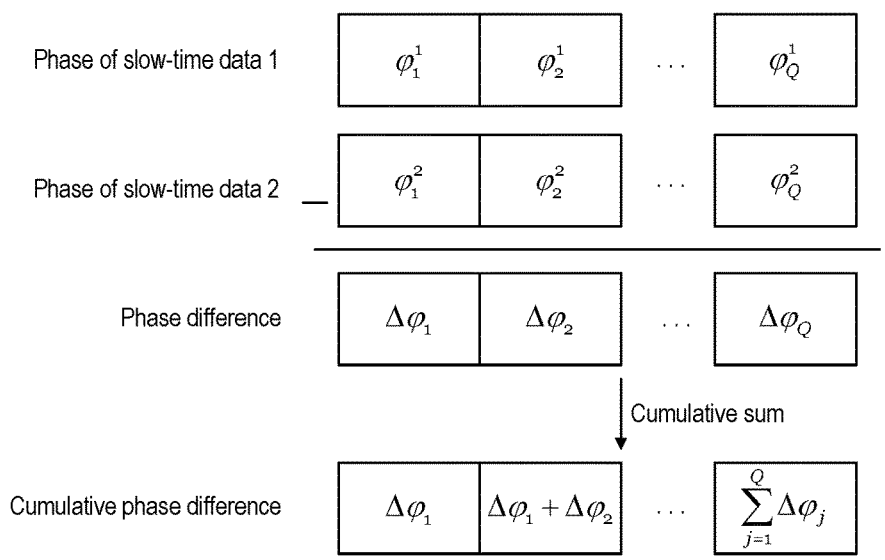
FIG. 7A illustrates a method for determining synthetic antennas, according to an embodiment of the present invention.

As shown in FIG. 7A, Q phase differences $\Delta\varphi_i$ are initially determined by subtracting the phase of range slow-time data from one sine filter 402 (e.g., the range slow-time data generated by sine filter $404_{M\_i}$) from the other phase of range slow-time data from one sine filter 402 (e.g., the range slow-time data generated by sine filter $404_{1\_i}$). As shown in FIG. 7A, the Q synthetic antennas $\Delta\phi_i$ are then determined by the cumulative phase difference of all preceding phase differences, such that the first synthetic antenna $\phi_1=\Delta\varphi_1$, the second synthetic antennas $\phi_2=\Delta\varphi_1+\Delta\varphi_2$, the $i^{th}$ synthetic antenna $$\phi_i = \sum_{j=1}^{i} \Delta\varphi_j,$$

and the $Q^{th}$ synthetic antennas $$\phi_i = \sum_{j=1}^{Q} \Delta\varphi_j.$$

Figure 7B:
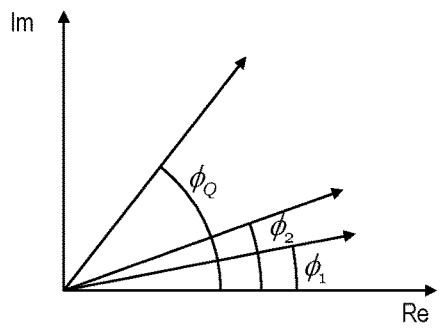
FIG. 7B illustrates the Q synthetic antennas of FIG. 7A, according to an embodiment of the present invention.

FIG. 7B illustrates Q synthetic antennas and associated phases, according to an embodiment of the present invention.

Thus, in some embodiments, each phase difference generator 408 determines the spatial phase difference between the associated antennas over all samples of the range-slow-time data, and creates synthetic signal with the cumulative sum of phase differences. In some embodiments, the amplitude of the synthetic antennas is based on the presence score determined by the associated presence score generator 406 (e.g., the maximum of the two associated presence scores, or the average of the two associated presence scores).

As shown in FIG. 4, in some embodiments, method 400 includes an angle estimator 410 per phase difference generator 408. In some embodiments, each angle estimator 410 determines the angle of the target based on the respective Q synthetic antennas (e.g., in a known manner) using digital beamforming techniques, such as using FFT, phase monopulse, minimum variance distortionless response (MVDR) beamformer, sine filters, etc.

In some embodiments, the output of each angle estimator 410 is indicative of the probability of a target being present in different angle zones of the range zone associated with the respective sine filter 404. In some embodiments, the outputs of all angle estimators 410 associated with a pair of antennas as integrated into an occupancy grid map 412 indicative of the probability of a target being present in the different range-angle zones. For example, FIG. 8 shows an occupancy grid map illustrating the different range-angle zones associated with the four non-overlapping sine filters 404 illustrated in FIGS. 5A and 5B, according to an embodiment of the present invention.

Figure 8:
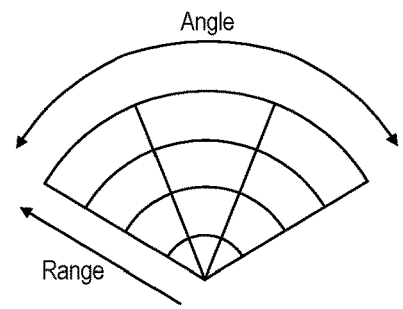
FIG. 8 illustrates an occupancy grid map associated with the four non-overlapping sine filters 404 illustrated in FIGS. 5A and 5B, according to an embodiment of the present invention.

As shown in FIG. 8, in an embodiment having four non-overlapping sine filters 402, the occupancy grid map 412 includes 4 range zones. As also illustrated in FIG. 8, in some embodiments, the number of angle zones per range zone may be 3, resulting in a total of 12 range-angle zones in the embodiment illustrated in FIG. 8. Higher number of angle zones per range zone (e.g., 4, 5, 6, or more) may be used. In some embodiments, 2 angle zones per range zone may be used.

Figure 9:
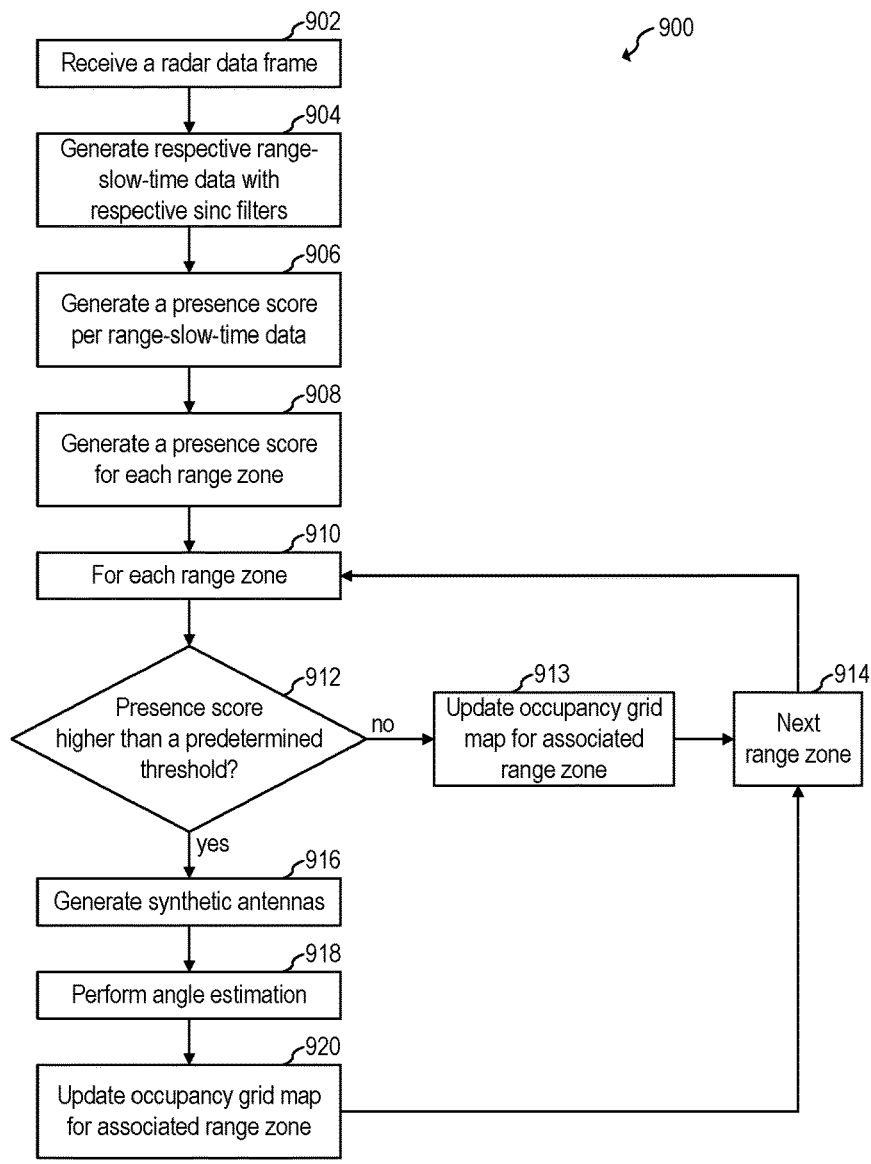
FIG. 9 shows a flow chart of an embodiment method for target presence detection, according to an embodiment of the present invention.

FIG. 9 shows a flow chart of embodiment method 900 for target presence detection, according to an embodiment of the present invention. In some embodiments, method 900 may be performed by processing system 204.

During step 902, a radar data frame that includes Q chirps is received, e.g., from millimeter-wave radar sensor 202. In some embodiments, Q is equal to 32. In some embodiments, Q is higher than 32, such as 64 or higher. In some embodiments, Q is lower than 32, such as 16 or lower.

In some embodiments, the radar data frame includes data from two receiving antennas 216. In some embodiments, the radar data frame includes data from mode than two receiving antennas, such as three antennas (e.g., in an L-shape configuration), or more than three antennas.

During step 904, for each receiving antenna data, a plurality of range-slow-time data is generated by a respective plurality of non-overlapping sine filters (e.g., 404).

During step 906, a presence score is generated (e.g., by presence score generator 406) for each range-slow-time data generated during step 904.

During step 908, a presence score is generated for each range zone. For example, in some embodiments, the presence score for each range zone is generated by averaging the presence scores associated with the same range zone. For example, for range zone i, the presence score may be generated by averaging the presence scores generated by presence score generators $406_{1\_i}$ to $406_{M\_i}$). In some embodiments, the presence score for each range zone is equal to the presence score generated by a particular presence score generator 406, such as the presence score generator 406 associated with higher the antenna exhibiting higher SNR (e.g., in the range-slow-time data).

As shown by steps 910 and 912, for each range zone, the presence score generated during step 908 is compared with a predetermined threshold. If the presence score is lower than the predetermined threshold (output "no" from step 912), then no target is detected as present in the associated range zone during step 912, and the occupancy grid map (e.g., 412) is updated during step 913, e.g., for all angle zones of the associated range zone, to reflect that no target is detected (e.g., low probability of presence detection) in the angle zones of the associated range zone. As shown by steps 914, the next range zone (if applicable) is evaluated after step 913. In some embodiments, the occupancy grid map is updated to have a probability of 0 for all the angle zones associated with the range zone in which no target is detected.

If the presence score is higher than the predetermined threshold (output "yes" from step 912), a target has been detected in the associated range zone, and synthetic antennas are generated during step 916 (e.g., using the associated phase difference generator 408) based on the range-slow-time data generated by the sine filters 402 associated with the range zone, and the angle zone of the detected target is identified during step 918 (e.g., using angle estimator 410) based on the associated synthetic antennas.

During step 920, the occupancy map grid (e.g., 412) is updated to reflect the target detection. For example, in some embodiments, the previous presence probability of each angle zone associated with the range zone in which presence is detected is updated with a new presence probability generated during step 918.

As shown in FIG. 9, some embodiments advantageously avoid performing steps 916, 918, and 920 when a target is not detected in a particular range zone, thereby advantageously reducing computation complexity, and associated costs (e.g., avoiding use of the associated power consumption, and freeing processing system 204 for performing other tasks).

In some embodiments, method 900 is performed per frame of radar data. Thus, in some embodiments, there is no temporal tracking of whether a target is present or not in each of the range-angle zones.

In some embodiments, temporal modeling is used to smoothen the transition between presence detection states for each range-angle zone of occupancy grid map 412, which may advantageously avoid false positives and improve the performance of the target detection. For example, FIG. 10 shows a flow chart of embodiment method 1000 for updating occupancy grid map 412, according to an embodiment of the present invention. In some embodiments, steps 913 and 920 may be performed as method 1000.

As will be described in more detail below, in some embodiments, method 1000 estimates new occupancy probability for range angle zone i,j based on a previous occupancy probability (e.g., from range angle zone i,j) and a new occupancy probability measurement.

During step 1002, a new occupancy probability value is received for range-angle zone i,j (where i represents an range index of occupancy grid map 412 and j represents an angle index of occupancy grid 412). In some embodiments, the received new occupancy probability value may be an output of the associated angle estimator 410. For example, in some embodiments, the received new occupancy probability value may be an SNR value of the output of the associated angle estimator 410. In some embodiments, the received new occupancy probability value may be a predetermined value (e.g., 0), such as generated when step 912 outputs "no."

During step 1004, a new occupancy probability for range-angle zone i,j is estimated based on the previous occupancy probability and the new occupancy probability value. For example, in some embodiments, the new occupancy probability for range-angle zone i,j may be given by $$LLR(i,j)^{n+1} = \alpha \cdot LLR(i,j)^n + (1-\alpha) \cdot V_{prob} \quad (3)$$

Where $LLR(i,j)^{n+1}$ represents the log-likelihood ratio for range-angle zone i,j associated with frame n+1, $LLR(i,j)^n$ represents the log-likelihood ratio for range-angle zone i,j associated with frame n, $\alpha$ is a (e.g., predetermined) factor between 0 and 1 (such as, e.g., 0.5), and $V_{prob}$ represents a presence probability value (e.g., received during step 1002). In some embodiments, probability value $V_{prob}$ may be given by $$V_{prob} = -2 \ln\left(\frac{L(m_1)}{L(m_2)}\right) \quad (4)$$

where $L(m_1)$ represents the probability distribution of the range-angle zone in which the presence has been detected (e.g., output of the associated angle estimator 410), and represents the (e.g., predetermined) probability distribution of the range-angle zone when occupancy presence is not detected. In some embodiments, $L(m_1)$ may be equal to the SNR of the output of the occupancy probability generated by angle estimator 412 and $L(m_1)$ may be equal to the SNR of a predetermined occupancy probability when a target is not present in the range-angle zone i,j.

As can be seen in Equations 3 and 4, some embodiments advantageously slow the transition between a presence detection state ($LLR(i,j)$ greater than a predetermined threshold), and a presence not detected state ($LLR(i,j)$ lower than the predetermined threshold), which may advantageously avoid false positive (e.g., due to noise).

In some embodiments, the presence of a strong target (e.g., a target near millimeter-wave radar sensor 202) in the raw radar data may cause a weak target to be confused with noise and not be detected. In some embodiments, successive interference cancellation (also referred to as SIC) may be used to remove radar data associated with a detected target from the raw radar data to improve the SNR at other range-zones and increase the changes of detecting weaker target(s) at other range-zones. For example, FIG. 11 shows a flow chart of embodiment method 1100 for target presence detection, according to an embodiment of the present invention. In some embodiments, method 1100 may be performed by processing system 204.

As can be seen in FIGS. 9 and 11, method 1100 is similar to method 900 any may perform steps 902, 904, 906, 908, 912, 916, 918, and 920 in a similar manner as described with respect to method 900. Method 1100, however, instead of iterating through the difference range zones sequentially (e.g., as illustrated by steps 910 and 914 of FIG. 9), method 1100 iterates through the different range zones based on the associated presence scores (e.g., from higher to lower) and the presence scores are updated after removing from the raw radar data the contributions of the strongest detected target, as illustrated by steps 1110, 1113 and 1114, which are described in more detail below.

During step 1110, the range zone associated with the highest presence score (generated during step 908) is selected.

As shown by step 912, when the selected presence score is lower than the predetermined threshold (output "no"), the occupancy grid is updated during step 1113 (e.g., by performing method 1000) for all angle zones of the selected range zone, as well as for all other range-angle zones not previously updated in the current frame, to reflect that no target is present. When the selected present score is higher than the predetermined threshold (output "yes"), the range-angle zones associated with the selected range zone are updated by performing steps 916, 918, and 920.

During step 1114, the contributions associated with the detected target(s) in the selected range zone are removed from the raw radar data. For example, in some embodiments, if the raw radar data (e.g., received during step 902) is given by $$y = h_1 x_1 + h_2 x_2 + \ldots + h_k x_k + n \quad (5)$$

and the estimated strongest target signal (the signal of the range zone associated with the highest presence score) is given by $$\hat{y} = h_k x_k \quad (6)$$

then, the raw radar signal is updated during step 1114 by $$y = y - \hat{y} \quad (7)$$

and step 904 is performed again. Alternatively, in some embodiments, a band stop filter may be used to remove the strongest target signal from the raw radar signal. This process is repeated until $$y \approx n \quad (8)$$

where $h_i k_i$ represents the targets present in the raw radar signal y, where $h_k k_k$ represents the strongest target present in the raw radar signal y, and n represents noise. In some embodiments, this process is repeated until Equation 8 is true or until a maximum number of iterations (e.g., 3) is reached.

In some embodiments, $\hat{y}$ represents the output (e.g., 600) of the complex sine filter 404 associated with the selected presence score.

By performing SIC (e.g., as illustrated FIG. 11), some embodiments are advantageously capable of detecting weak targets in the presence of stronger targets while minimizing the computational complexity (since, once equation 8 becomes true, the output of step 912 becomes "no" and step 1113 is performed).

Advantages of some embodiments include the ability of performing occupancy detection independent from the amount of people on the scene and/or on the particular range-angle zone, which may advantageously avoid complex target tracking and may be advantageously implemented in a (e.g., embedded) processor with limited memory and computational capacity. Additional advantages include the capability of focusing on static human targets, where only micro movements, like breathing are performed.

Example embodiments of the present invention are summarized here. Other embodiments can also be understood from the entirety of the specification and the claims filed herein.

Example 1. A method including: receiving radar digital data; processing the radar digital data with a plurality of sine filters to generate a respective plurality of range-slow-time data, where each sine filter is associated with a respective range zone of a plurality of range zones; generating a first presence score indicative of a probability of target presence in a first range zone of the plurality of range zones based on a first range-slow-time data of the plurality of range-slow-time data, where the first range-slow-time data is associated with the first range zone; and when the first presence score is higher than a predetermined threshold, generating a plurality of synthetic antennas based on the first range-slow-time data, performing angle estimation based on the plurality of synthetic antennas to generate first probability values for a plurality of angle zones associated with the first range zone, and updating an occupancy grid map indicative of a probability of target presence in each angle zone of each of the plurality of range zones based on the first probability values.

Example 2. The method of example 1, where generating the first presence score includes generating the first presence score based on a first covariance matrix of the first range-slow-time data.

Example 3. The method of one of examples 1 or 2, where generating the first presence score includes computing a norm of the first covariance matrix.

Example 4. The method of one of examples 1 to 3, where the radar digital data is organized in frames, each frame having Q chirps, Q being a positive integer greater than 1, and where generating the plurality of synthetic antennas includes generating Q synesthetic antennas based on Q phase differences between the first range-slow-time data and a second range-slow-time data, where the first range-slow-time data is associated with a first receiving antenna of a millimeter-wave radar system, and the second range-slow-time data is associated with a second receiving antenna of the millimeter-wave radar system, where the second range-slow-time data is associated with the first range zone.

Example 5. The method of one of examples 1 to 4, where performing angle estimation includes performing digital beamforming using minimum variance distortionless response (MVDR).

Example 6. The method of one of examples 1 to 5, further including: generating a plurality of presence scores based on the plurality of range-slow-time data, the plurality of presence scores including the first presence score, where the first presence score is the highest presence score of the plurality of presence scores, and where the first presence score is higher than the predetermined threshold; subtracting from the radar digital data target data associated with the first presence score to generate updated radar digital data; processing the updated radar digital data with the plurality of sine filters to generate a further respective plurality of range-slow-time data; generating a further plurality of presence scores based on the further plurality of range-slow-time data; selecting a second range-slow-time data from the further plurality of range slow-time data, the second range-slow-time data having a second presence score, the second presence score being the highest presence score of the further plurality of presence scores, the second range-slow-time data being associated with a second range zone different from the first range zone; and when the second presence score is higher than the predetermined threshold, generating a further plurality of synthetic antennas based on the second range-slow-time data, performing a further angle estimation based on the further plurality of synthetic antennas to generate second probability values for a further plurality of angle zones associated with the second range zone, and updating the occupancy grid map based on the second probability values.

Example 7. The method of one of examples 1 to 6, further including, when the second presence score is lower than the predetermined threshold, updating the occupancy grid map to reflect no presence detection in the second range zone.

Example 8. The method of one of examples 1 to 7, where updating the occupancy grid map is further based on a previous state of the occupancy grid map.

Example 9. The method of one of examples 1 to 8, where the plurality of sine filters includes a plurality of non-overlapping complex sine filters.

Example 10. A millimeter-wave radar system including: a millimeter-wave radar sensor configured to transmit radar signals, receive reflected radar signals, and generate radar digital data based on the reflected radar signals; and a processing system configured to: process the radar digital data with a plurality of sine filters to generate a respective plurality of range-slow-time data, where each sine filter is associated with a respective range zone of a plurality of range zones, generate a first presence score indicative of a probability of target presence in a first range zone of the plurality of range zones based on a first range-slow-time data of the plurality of range-slow-time data, where the first range-slow-time data is associated with the first range zone, and when the first presence score is higher than a predetermined threshold, generate a plurality of synthetic antennas based on the first range-slow-time data, perform angle estimation based on the plurality of synthetic antennas to generate first probability values for a plurality of angle zones associated with the first range zone, and update an occupancy grid map indicative of a probability of target presence in each angle zone of each of the plurality of range zones based on the first probability values.

Example 11. The millimeter-wave radar system of example 10, where generating the first presence score includes generating the first presence score based on a first covariance matrix of the first range-slow-time data.

Example 12. The millimeter-wave radar system of one of examples 10 or 11, where generating the first presence score includes computing a norm of the first covariance matrix.

Example 13. The millimeter-wave radar system of one of examples 10 to 12, further including first and second receiving antennas configured to receive the reflected radar signals, where the radar digital data is organized in frames, each frame having Q chirps, Q being a positive integer greater than 1, and where generating the plurality of synthetic antennas includes generating Q synesthetic antennas based on Q phase differences between the first range-slow-time data and a second range-slow-time data, where the first range-slow-time data is associated with the first receiving antenna, and the second range-slow-time data is associated with the second receiving antenna, where the second range-slow-time data is associated with the first range zone.

Example 14. The millimeter-wave radar system of one of examples 10 to 13, further including a third receiving antennas, where the first, second, and third receiving antennas are arranged in an L-shape, where generating the first presence score includes generating the first presence score based on the first and second range-slow-time data, and further based on a third range-slow-time data associated with the third receiving antenna.

Example 15. The millimeter-wave radar system of one of examples 10 to 14, where updating the occupancy grid map is further based on a previous state of the occupancy grid map.

Example 16. The millimeter-wave radar system of one of examples 10 to 15, where the plurality of sine filters is a plurality of non-overlapping complex sine filters.

Example 17. A method including: receiving a first frame of radar digital data, the first frame including Q chirps, Q being aa positive integer greater than 1, the first frame including first and second data from first and second receiving antennas of a millimeter-wave radar system, respectively; processing the first data with a first plurality of sine filters to generate a respective first plurality of range-slow-time data, where each sine filter of the first plurality of sine filters is associated with a respective range zone of a plurality of range zones; processing the second data with a second plurality of sine filters to generate a respective second plurality of range-slow-time data, where each sine filter of the second plurality of sine filters has a corresponding sine filter of the first plurality of sine filters; generating a first presence score indicative of a probability of target presence in a first range zone of the plurality of range zones based on a first range-slow-time data of the first plurality of range-slow-time data or on a second range-slow-time data of the second plurality of range-slow-time data, where the first range-slow-time data is associated with the first range zone and the second range-slow-time data is associated with the first range zone; and when the first presence score is higher than a predetermined threshold, generating a plurality of synthetic antennas based on the first and second range-slow-time data, performing angle estimation based on the plurality of synthetic antennas to generate first probability values for a plurality of angle zones associated with the first range zone, and updating an occupancy grid map indicative of a probability of target presence in each angle zone of each of the plurality of range zones based on the first probability values.

Example 18. The method of example 17, further including receiving a second frame of radar digital data before receiving the first frame, where updating the occupancy grid map is further based on the second frame.

Example 19. The method of one of examples 17 or 18, where updating the occupancy grid map is based on a signal-to-noise ratio (SNR) associated with the first probability values.

Example 20. The method of one of examples 17 to 19, where generating the plurality of synthetic antennas includes generating the plurality of synthetic antennas based on cumulative sums of phase differences between the first and second range-slow-time data.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   receiving radar digital data;
   processing the radar digital data with a plurality of sinc filters to generate a respective plurality of range-slow-time data, wherein each sinc filter is associated with a respective range zone of a plurality of range zones, and each of the plurality of range-slow-time data is based on an accumulated energy of a received radar chirp of a plurality of radar chirps;
   generating a first presence score indicative of a probability of target presence in a first range zone of the plurality of range zones based on a first range-slow-time data of the plurality of range-slow-time data, wherein the first range-slow-time data is associated with the first range zone and a first receiving antenna;
   determining that the first presence score is higher than a predetermined threshold; and
   in response to the first presence score being higher than the predetermined threshold,
   generating a plurality of synthetic antennas based on the first range-slow-time data, and on second range-slow-time data associated with a second receiving antenna, performing angle estimation based on the plurality of synthetic antennas to generate first probability values for a plurality of angle zones associated with the first range zone, and updating an occupancy grid map indicative of a probability of target presence in each angle zone of each of the plurality of range zones based on the first probability values.

2. The method of claim 1, wherein generating the first presence score comprises generating the first presence score based on a first covariance matrix of the first range-slow-time data.

3. The method of claim 2, wherein generating the first presence score comprises computing a norm of the first covariance matrix.

4. The method of claim 1, wherein the radar digital data is organized in frames, each frame having Q chirps, Q being a positive integer greater than 1, and wherein generating the plurality of synthetic antennas comprises generating Q synthetic antennas based on Q phase differences between the first range-slow-time data and the second range-slow-time data, wherein the second range-slow-time data is associated with the first range zone.

5. The method of claim 1, wherein performing angle estimation comprises performing digital beamforming using minimum variance distortionless response (MVDR).

6. The method of claim 1, further comprising:
generating a plurality of presence scores based on the plurality of range-slow-time data, the plurality of presence scores comprising the first presence score, wherein the first presence score is a highest presence score of the plurality of presence scores, and wherein the first presence score is higher than the predetermined threshold;
subtracting from the radar digital data target data associated with the first presence score to generate updated radar digital data;
processing the updated radar digital data with the plurality of sinc filters to generate a further respective plurality of range-slow-time data;
generating a further plurality of presence scores based on the further plurality of range-slow-time data;
selecting the second range-slow-time data from the further plurality of range slow-time data, the second range-slow-time data having a second presence score, the second presence score being a highest presence score of the further plurality of presence scores, the second range-slow-time data being associated with a second range zone different from the first range zone;
determining that the second presence score is higher than the predetermined threshold; and
in response to the second presence score being higher than the predetermined threshold,
generating a further plurality of synthetic antennas based on the second range-slow-time data,
performing a further angle estimation based on the further plurality of synthetic antennas to generate second probability values for a further plurality of angle zones associated with the second range zone, and
updating the occupancy grid map based on the second probability values.

7. The method of claim 6, further comprising:
determining that the second presence score is lower than the predetermined threshold; and in response to the second presence score being lower than the predetermined threshold, updating the occupancy grid map to reflect no presence detection in the second range zone.

8. The method of claim 1, wherein updating the occupancy grid map is further based on a previous state of the occupancy grid map.

9. The method of claim 1, wherein the plurality of sinc filters comprises a plurality of non-overlapping complex sinc filters.

10. The method of claim 1, wherein generating the plurality of synthetic antennas comprises:
determining phase differences between data of the first range-slow-time data and data of the second range-slow-time data; and
determining a plurality of cumulative phase differences of the determined phase differences, wherein each of the plurality of cumulative phase differences represents a corresponding synthetic antenna of the plurality of synthetic antennas.

11. A millimeter-wave radar system comprising:
a millimeter-wave radar sensor configured to transmit radar signals, receive reflected radar signals, and generate radar digital data based on the reflected radar signals; and
a processing system configured to:
process the radar digital data with a plurality of sinc filters to generate a respective plurality of range-slow-time data, wherein each sinc filter is associated with a respective range zone of a plurality of range zones, and each of the plurality of range-slow-time data is based on an accumulated energy of a received radar chirp of a plurality of radar chirps,
generate a first presence score indicative of a probability of target presence in a first range zone of the plurality of range zones based on a first range-slow-time data of the plurality of range-slow-time data, wherein the first range-slow-time data is associated with the first range zone and a first receiving antenna, and
when the first presence score is higher than a predetermined threshold,
generate a plurality of synthetic antennas based on the first range-slow-time data, and on second range-slow-time data associated with a second receiving antenna,
perform angle estimation based on the plurality of synthetic antennas to generate first probability values for a plurality of angle zones associated with the first range zone, and
update an occupancy grid map indicative of a probability of target presence in each angle zone of each of the plurality of range zones based on the first probability values.

12. The millimeter-wave radar system of claim 11, wherein generating the first presence score comprises generating the first presence score based on a first covariance matrix of the first range-slow-time data.

13. The millimeter-wave radar system of claim 12, wherein generating the first presence score comprises computing a norm of the first covariance matrix.

14. The millimeter-wave radar system of claim 11, further comprising the first and second receiving antennas configured to receive the reflected radar signals, wherein the radar digital data is organized in frames, each frame having Q chirps, Q being a positive integer greater than 1, and wherein generating the plurality of synthetic antennas comprises generating Q synthetic antennas based on Q phase differences between the first range-slow-time data and the second range-slow-time data, wherein the second range-slow-time data is associated with the first range zone.

15. The millimeter-wave radar system of claim 14, further comprising a third receiving antenna, wherein the first, second, and third receiving antennas are arranged in an L-shape, wherein generating the first presence score comprises generating the first presence score based on the first and second range-slow-time data, and further based on a third range-slow-time data associated with the third receiving antenna.

16. The millimeter-wave radar system of claim 11, wherein updating the occupancy grid map is further based on a previous state of the occupancy grid map.

17. The millimeter-wave radar system of claim 11, wherein the plurality of sinc filters is a plurality of non-overlapping complex sinc filters.

18. A method comprising:
receiving a first frame of radar digital data, the first frame comprising Q chirps, Q being a positive integer greater than 1, the first frame comprising first and second data from first and second receiving antennas of a millimeter-wave radar system, respectively;
processing the first data with a first plurality of sinc filters to generate a respective first plurality of range-slow-time data, wherein each sinc filter of the first plurality of sinc filters is associated with a respective range zone of a plurality of range zones, and each of the first plurality of range-slow-time data is based on a first accumulated energy of a corresponding received radar chirp of a plurality of radar chirps;
processing the second data with a second plurality of sinc filters to generate a respective second plurality of range-slow-time data, wherein each sinc filter of the second plurality of sinc filters has a corresponding sinc filter of the first plurality of sinc filters, and each of the second plurality of range-slow-time data is based on a second accumulated energy of the corresponding received radar chirp of the plurality of radar chirps;
generating a first presence score indicative of a probability of target presence in a first range zone of the plurality of range zones based on a first range-slow-time data of the first plurality of range-slow-time data or on a second range-slow-time data of the second plurality of range-slow-time data, wherein the first range-slow-time data is associated with the first range zone and the second range-slow-time data is associated with the first range zone;
determining that the first presence score is higher than a predetermined threshold; and
in response to the first presence score being higher than the predetermined threshold,
generating a plurality of synthetic antennas based on the first and second range-slow-time data,
performing angle estimation based on the plurality of synthetic antennas to generate first probability values for a plurality of angle zones associated with the first range zone, and
updating an occupancy grid map indicative of a probability of target presence in each angle zone of each of the plurality of range zones based on the first probability values.

19. The method of claim 18, further comprising receiving a second frame of radar digital data before receiving the first frame, wherein updating the occupancy grid map is further based on the second frame.

20. The method of claim 18, wherein updating the occupancy grid map is based on a signal-to-noise ratio (SNR) associated with the first probability values.

21. The method of claim 18, wherein generating the plurality of synthetic antennas comprises generating the plurality of synthetic antennas based on cumulative sums of phase differences between the first and second range-slow-time data.

* * * * *